US009971998B2

(12) United States Patent
Nuzzi

(10) Patent No.: US 9,971,998 B2
(45) Date of Patent: *May 15, 2018

(54) LOCATION-BASED AUTOMATIC PAYMENT SYSTEM

(75) Inventor: Frank Anthony Nuzzi, Pflugerville, TX (US)

(73) Assignee: PayPal, Inc., San Jose, CA (US)

( * ) Notice: Subject to any disclaimer, the term of this patent is extended or adjusted under 35 U.S.C. 154(b) by 1014 days.

This patent is subject to a terminal disclaimer.

(21) Appl. No.: 13/035,251

(22) Filed: Feb. 25, 2011

(65) Prior Publication Data

US 2012/0221463 A1    Aug. 30, 2012

(51) Int. Cl.
G06Q 20/10    (2012.01)
G06Q 20/32    (2012.01)
G06Q 20/40    (2012.01)

(52) U.S. Cl.
CPC .......... *G06Q 20/102* (2013.01); *G06Q 20/10* (2013.01); *G06Q 20/3224* (2013.01); *G06Q 20/405* (2013.01)

(58) Field of Classification Search
CPC ...................................... G06Q 20/10
See application file for complete search history.

(56) References Cited

U.S. PATENT DOCUMENTS

| | | | |
|---|---|---|---|
| 8,135,624 B1 | 3/2012 | Ramalingam et al. | |
| 2003/0004792 A1* | 1/2003 | Townzen | G07B 15/00 705/13 |
| 2005/0240432 A1* | 10/2005 | Jensen | G06Q 20/10 705/39 |
| 2006/0041505 A1* | 2/2006 | Enyart | G06Q 20/102 705/40 |
| 2007/0192189 A1* | 8/2007 | Popowich et al. | 705/14 |
| 2007/0262134 A1* | 11/2007 | Humphrey | G06Q 20/105 235/379 |
| 2008/0040233 A1 | 2/2008 | Wildman et al. | |
| 2009/0157518 A1* | 6/2009 | Bishop et al. | 705/19 |
| 2009/0228325 A1 | 9/2009 | Simmons et al. | |
| 2009/0248577 A1* | 10/2009 | Hoj | G06Q 20/102 705/40 |
| 2009/0288012 A1 | 11/2009 | Hertel et al. | |
| 2010/0130233 A1* | 5/2010 | Parker | H04M 1/72538 455/456.3 |
| 2011/0153495 A1* | 6/2011 | Dixon et al. | 705/39 |
| 2011/0191244 A1* | 8/2011 | Dai | 705/44 |
| 2011/0202455 A1* | 8/2011 | Vasten et al. | 705/39 |
| 2012/0130796 A1 | 5/2012 | Busch | |
| 2012/0191566 A1 | 7/2012 | Sayan | |

OTHER PUBLICATIONS

PCT International Search Report, Application No. PCT/US2012/26233 dated Jun. 14, 2012.

* cited by examiner

Primary Examiner — Bruce I Ebersman
(74) Attorney, Agent, or Firm — Haynes & Boone, LLP

(57) ABSTRACT

A method for making a location-based automatic payment includes receiving an automatic payment instruction that designates a payee account. The automatic payment instruction is associated with a payer account in a database. A payment location is received and associated with the automatic payment request in the database. A payer device that is associated with the payer account is determined to be in the payment location and, in response, a payment request is sent over a network to make a payment from the payer account to the payee account.

20 Claims, 9 Drawing Sheets

LOCATION-BASED AUTOMATIC PAYMENT SYSTEM

BACKGROUND

Field of the Invention

The present invention generally relates to online and/or mobile payments and more particularly to a location-based automatic payment system.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

It is sometimes desirable to provide payments automatically. For example, a payer may have one or more reoccurring payments such as, for example, a mortgage payment, utility bills, etc, and the payer may instruct a payment service provider to make those payments automatically. Typically, the payer may create a time-based automatic payment by specifying a payee, a day of the month, and an amount for the automatic payment, and then the payment service provider will may that payment to that payee at that time every month. However, such conventional systems cannot account for reoccurring payments that may be variable with respect to time.

Thus, there is a need for an improved automatic payment system.

SUMMARY

According to one embodiment, a method for making a location-based automatic payment includes receiving an automatic payment instruction that designates a payee account. The automatic payment instruction is associated with a payer account in a database. A payment location is also received and associated with the automatic payment instruction in the database.

In an embodiment, the method determines that a payer device that is associated with the payer account is in the payment location and, in response, sends a payment request over a network to make a payment from the payer account to the payee account. In another embodiment, a payment time period and/or a maximum payment frequency may be associated with the automatic payment instruction, and when the method determines that the payer device is in the payment location, the method also may determine whether a current time corresponds to the payment time period or whether a plurality of previous payments exceed the maximum frequency in order to determine whether to make the payment.

As a result, a payer may create automatic payments that are triggered based on the location of a payment device. This may be particularly useful when the payer periodically makes payments to a payee only when the payer is in the same location as the payee.

These and other features and advantages of the present disclosure will be more readily apparent from the detailed description of the embodiments set forth below taken in conjunction with the accompanying figures.

Figure 1:
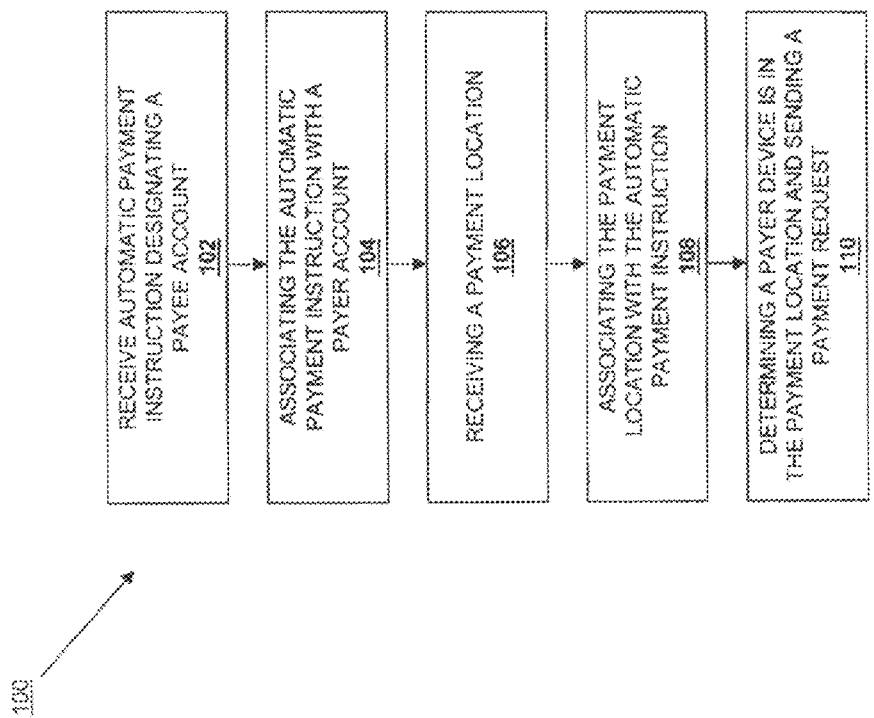
FIG. 1 is a flow chart illustrating an embodiment of a method for making an automatic payment based on a payer location.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for making automatic payments based on the location of a payer. An automatic payment instruction designates a payee account, includes a payment location, and is associated with a payer account. When a payer device that is associated with that automatic payment instruction and/or payer account is determined to be in the payment location, a payment request to make a payment from the payer account to the payee account is sent over a network. A payment time period and/or a maximum payment frequency may be associated with the payment location of the automatic payment instruction to further specific when and/or how often the automatic payment should be made. The system and method allow a payer to automatically makes payments to a payee by simply being in a designated location.

Figure 2:
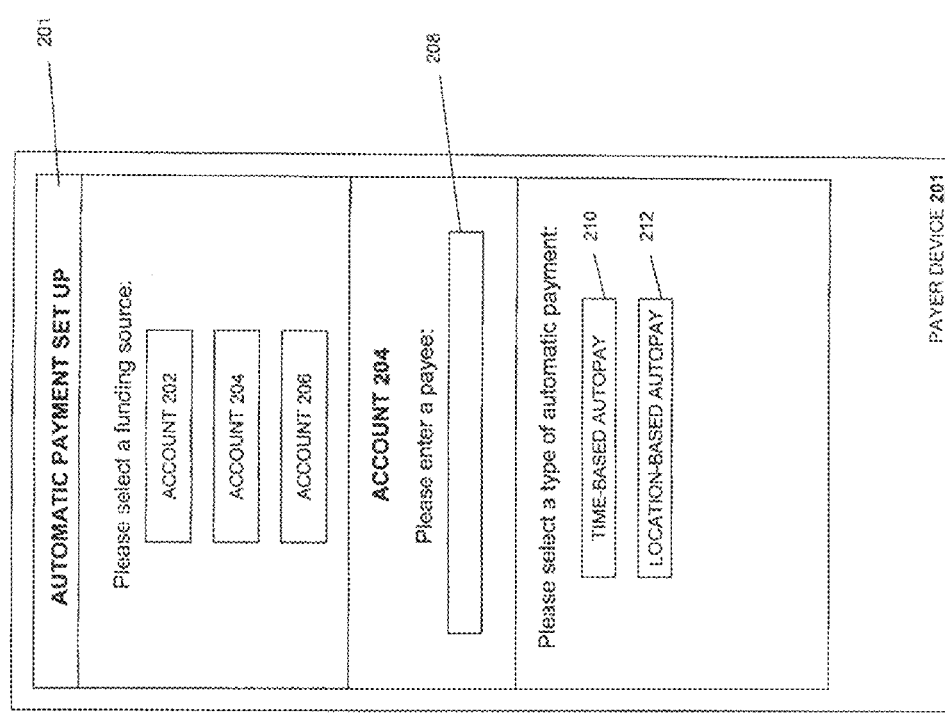
FIG. 2 is a front view illustrating an embodiment of a payer device being used to provide an automatic payment instruction.

Referring now to FIGS. 1 and 2, a method 100 for making location-based automatic payments is illustrated. In the embodiment of the method 100 described below, an account provider provides an payer with a payer account, and the payer may use the payer account to fund payments for purchases made from payees. In another embodiment, a payment service provider such as, for example, PayPal, Inc. of San Jose, Calif. assists in the making of payments from the payer to the payee by transferring funds from the payer account to a payee account of the payee. However, these embodiments are meant to be merely exemplary, and one of skill in the art will recognize that a variety of modifications may be made to the payment system discussed below without departing from the scope of the present disclosure.

The method 100 begins at blocks 102 and 104 where an automatic payment instruction is received and that automatic payment instruction is associated with a payer account. In an embodiment, a payer having a payer device 200, illustrated in FIG. 2, may access their account over a network (e.g., the Internet) by connecting to an account provider device of the account provider, may access a payment service account over the network by connecting to a payment service provider device of a payment service provider, or may provide the automatic payment instruction discussed below to the payer device 200 (e.g., to a database or storage device on the payer device 200.) One of skill in the art will recognize that either or both of an account provider or a payment service provider may provide for the location-based automatic payments from the payer account as is discussed below. While the user device 200 is illustrated and described below as a mobile device such as, for example, a mobile phone or computer, one of skill in the art will recognize that the setting of the location-based automatic payments from the payer account may be performed on a desktop computer, on other computing systems connected to a network, and/or using a variety of other devices known in the art.

At block 102 and 104 of the method 100, the payment system provides the payer with an automatic payment instruction page 201 to create an automatic payment instruction for making automatic payments from the payer account. In the embodiment illustrated in FIG. 2, the payer is providing the automatic payment instruction page 201 for a payment service account provided by a payment service provider that allows the payer to make payments from any of a plurality of payer accounts 202, 204, and 206, and the payer has selected the account 204 for making automatic payments. In an embodiment, the payment service provider may receive (e.g., at a payment service provider device through a network) the payer account and associate the payer account with the automatic payment instruction in a database, or the payer account may be associated with the automatic payment instruction in the payer device 200. In response to selecting the account 204 for automatic payments, the payment system presents the payer with a payee input 208 in which the payer is prompted to enter a payee to whom the automatic payments are to be made. Entry of the payee may include entering the payee's email address, phone number, user name, name, or other payee identifier.

In an embodiment, the payment service provider device and/or the payer device may receive the payee entered in the payee input and then determine a payee account that is associated with that payee and associate that payee account with the automatic payment instruction in a database. In another embodiment, the payer may access an account provided by an account holder, and rather than being presented with multiple accounts, the payer may only be presented with the payee input 208 for a single account (e.g., the account 204 provided by the account provider.) The payment system may then present the payee with automatic payment options including a time-based automatic payment option 210 (discussed above) and a location-based automatic payment option 212.

Figure 3:
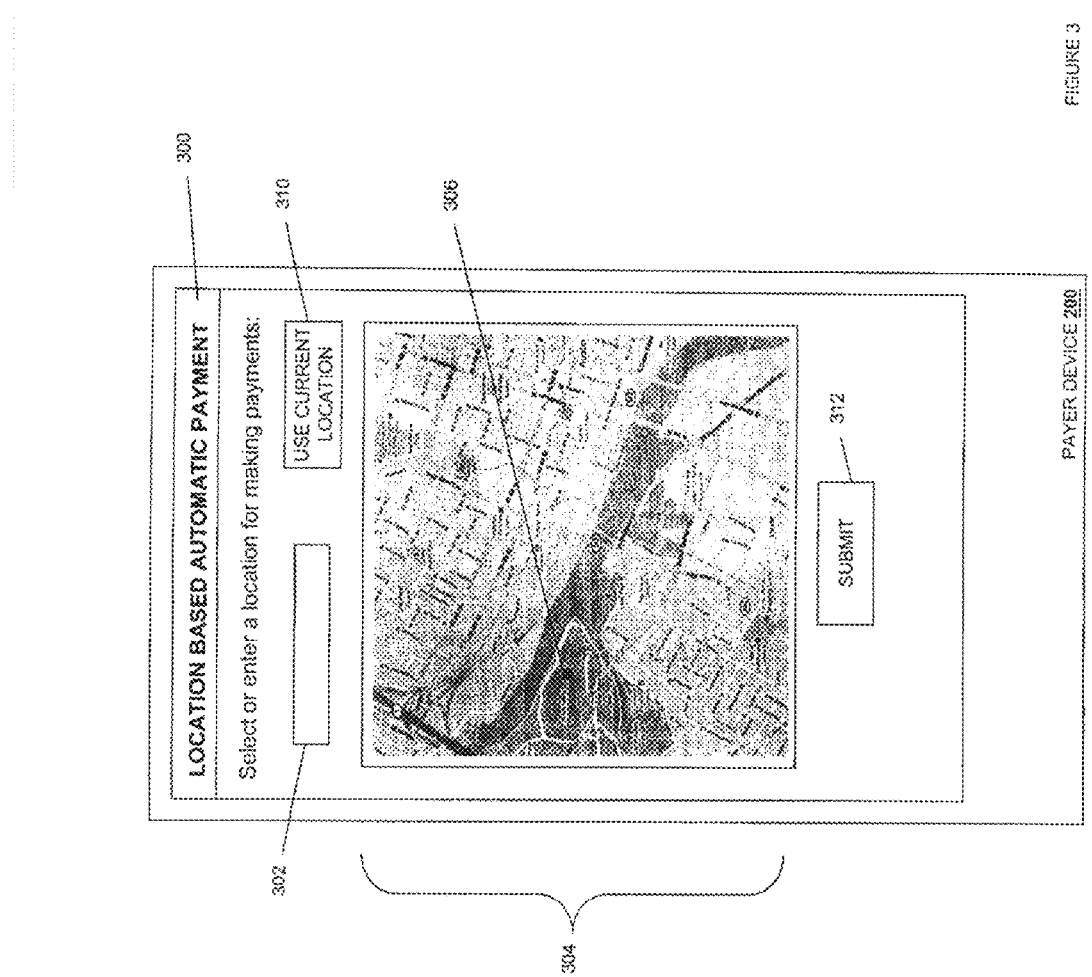
FIG. 3 is a front view illustrating an embodiment of a payer device being used to provide a payment location for an automatic payment instruction.

Referring now to FIGS. 1 and 3, the method 100 then proceeds to blocks 106 and 108 where a payment location is received and associated with the automatic payment instruction. A selection by the payer of the location-based automatic payment option 212 on the automatic payment instruction page 201 may result in the payment system presenting the payer (e.g., on the payer device 200) with a location provision page 300 for the automatic payment instruction. The location provision page 300 includes location input 302 and a map indicator 304.

In an embodiment, the location input 302 allows the payer to key in a payment location. For example, the payer may key in a payee name, an address, and/or a variety of other location information known in the art in order to indicate a location at which the payer would like automatic payments to be made. In an embodiment, upon keying the payment location into the location input 302, a payment location indicator 306 may be displayed on the map indicator 304 to indicate to the payer where on the map the payment location that was keyed into the location input 302 is located.

In an embodiment, the payer may select a Use Current Location button 310 in order to provide a payment location that is the current location of the payer and payer device 200. For example, selection of the Use Current Location button 310 may result in location data being retrieved by a location determination device (e.g., a Global Positioning System (GPS) device, a cell tower triangulation system device, and/or a variety of other location determination devices known in the art) in the payer device 200, and the location determination data being used to provide the payment location. In an embodiment, in response to a selection of the Use Current Location button 310, a payment location indicator 306 may be displayed on the map indicator 304 to indicate to the payer where on the map the payment location that corresponds to the location data retrieved from the location determination device is located.

In an embodiment, the payer may use the map indicator 304 to select a payment location. For example the payer device 200 may be a touch sensitive device, and the payer may select the payment location indicator 306 using a method known in the art (e.g., touching the payer device at the desired payment location on the map indicator, "dropping a pin" on the map indicator 304 and manipulating "the pin" with a finger to the desired payment location, selecting an area on the map indicator 304, etc.)

When the payer has provided the payment location on the location provision page 300, the payer may select the Submit button 312 to associate the payment location with the automatic payment instruction (e.g., in the payer device 200, by sending the payment location to the payment service provider device and/or the account provider device over the network, etc.) While a number of embodiments of a payment location selection process have been described for providing a payment location to make automatic payments, such embodiments are merely exemplary, and one of skill in the art will understand that a variety of other payment location selections processes will fall within the scope of the present disclosure.

Figure 4:
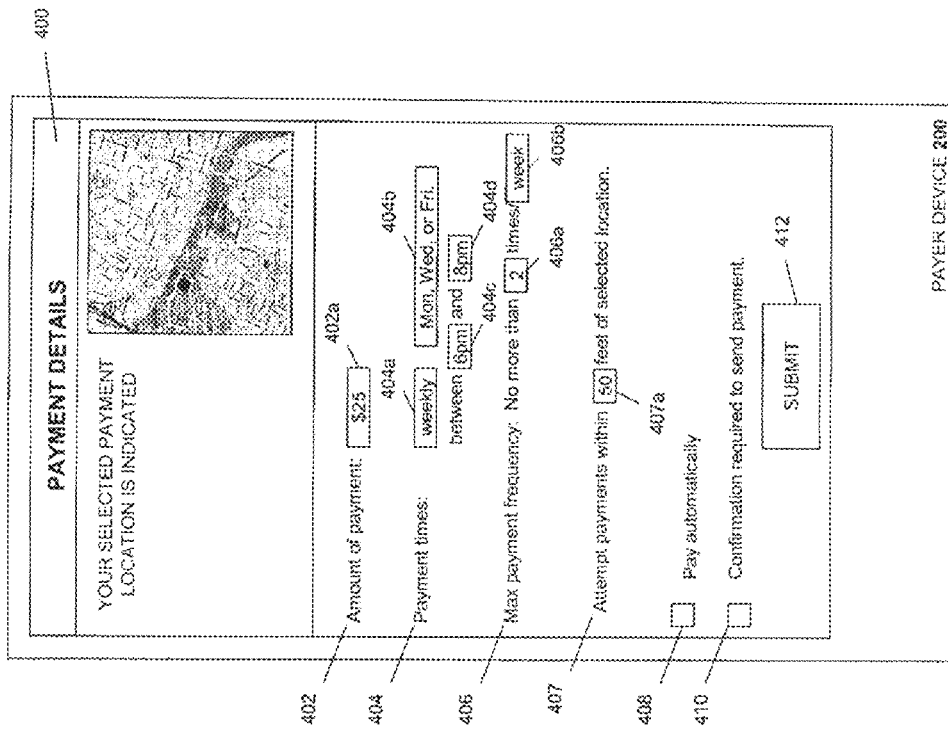
FIG. 4 is a front view illustrating an embodiment of a payer device being used to provide payment details for a payment location associated with an automatic payment instruction.

In an embodiment, the automatic payment instruction may include associated payment details that may be selected by the payer and applied to the automatic payment instruction (e.g., upon the payer selecting the Submit button 312.) Referring now to FIG. 4, an embodiment of a payment details page 400 is illustrated that the payment system may present to the payer upon the payer providing a payment location on the location provision page 300. The payment details page 400 includes a Payment Amount detail 402, a Payment Time Period detail 404, a Maximum Payment Frequency detail 406, a Payment Location Proximity detail 407, a Pay Automatically detail 408, and a Request Confirmation Before Paying detail 410. The payer may then use the payments details page 400 to associate payment details with the payment location provided in the automatic payment instruction.

For example, if the payer wishes to automatically make a payment of the same amount each time the payer is located in the payment location, the payer may enter a payment amount (e.g., $25 in the illustrated embodiment) in a payment amount input 402a of the Payment Amount detail 402. If the payer wishes to automatically make a payment only at certain times that the payer is located in the payment location, the payer may modify time period inputs 404a, 404b, 404c, and 404d (e.g., to limit automatic payments to being made on Monday, Wednesday, and Friday of each week between 6 pm and 8 pm in the illustrated embodiment) in the Payment Time Period detail 404. If the payer wishes to automatically make payments at no greater than a certain frequency, the payer may modify frequency inputs 406a and 406b (e.g., no more than 2 times per week in the illustrated embodiment) in the Maximum Payment Frequency detail 406. If the payer wishes adjust the sensitivity of the payment location, the payer may modify a proximity input 412a (e.g., such that payments will be attempted when the payer device is within 50 ft of the payment location) in the Payment Location Proximity detail 412 (the proximity input 412a may include a default value.) If the payer wishes for payments to be made automatically (e.g., in response to the automatic payment request being satisfied and no further confirmation from the payer), the payer may select the Pay Automatically detail 408. If the payer wishes for a confirmation to be requested before making an automatic payment (e.g., in response to the automatic payment request being satisfied, a confirmation request being sent to the payer device 200), the payer may select the Request Confirmation Before Paying detail 410. The payer may then select the Submit button 412 to associate the payment details with the payment location in the automatic payment instruction (e.g., in the payer device 200, by sending the payment details to the payment service provider device and/or the account provider device, etc.)

One of skill in the art will recognize how combinations of the payment details 402, 404, 406, 407, 408, and/or 410 may be applied to the payment location discussed above to precisely define how an automatic payment is to be made. Furthermore, the payment details discussed above are meant to be merely exemplary, and one of skill in the art will recognize how a variety of other payment details may be provided to further define how and when the automatic payment should be made without departing from the scope of the present disclosure.

Figure 5:
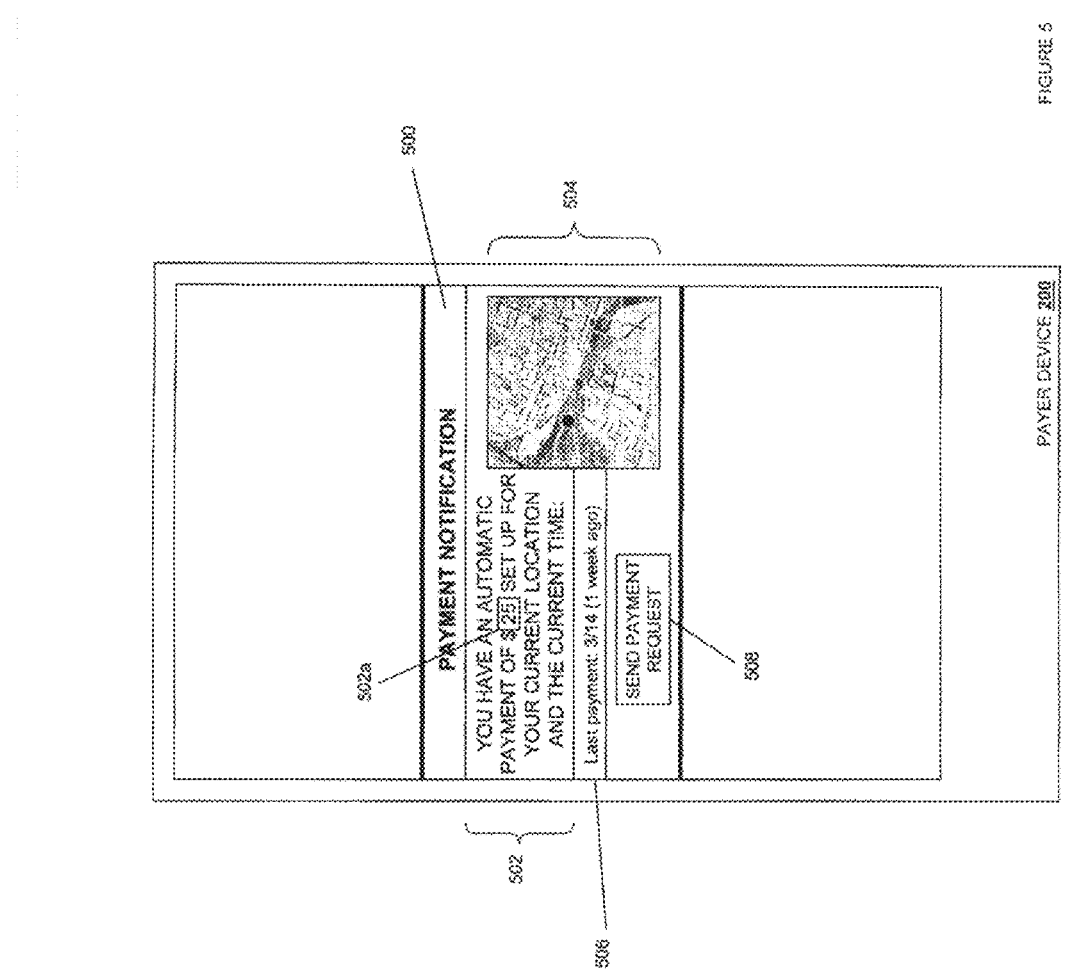
FIG. 5 is a front view illustrating an embodiment of a payer device being used to provide an alert that an automatic payment has been instructed to be made at a payment location.

Referring now to FIGS. 1 and 5, the method 100 then proceeds to block 110 where it is determined that a payer device is in the payment location and, in response, a payment request is sent. As discussed above, the payer device 200 includes a location determination device (e.g., a Global Positioning System (GPS) device, a cell tower triangulation system device, and/or a variety of other location determination devices known in the art) that is operable to determine a current location of the payer device 200 that may be used to trigger an automatic payment according to the automatic payment instruction discussed above. That current location may be determined, for example, by using location data received from the location determination device.

For example, the location determination device on the payer device 200 may determine a current location of the payer device and that current location may be compared with the payment locations associated with automatic payment instructions in the payer device 200 to determine that the payer device 200 is in a payment location. In an embodiment, the payer device 200 may be determined to be in a payment location associated with an automatic payment instruction if the payer device is within a predetermined distance of the payment location (e.g., according to the Payment Location Proximity detail 412 discussed above.) In another embodiment, the location determination device may determine first location data for a current location of the payer device, and that first location data may be compared to second location data for a payment location that is associated with an automatic payment instruction in the payment device 200 to determine that the first location data corresponds to the payment location. In an embodiment, the first location data may be determined to be in a payment location associated with an automatic payment instruction if the first location data is within a predetermined distance of the second location data for the payment location (e.g., according to the Payment Location Proximity detail 412 discussed above.) In response to determining that the payment device 200 is in a payment location associated with an automatic payment instruction, a payment request may be sent by the payer device 200 over the network to a payment service provider device and/or an account provider device to make a payment from the payer account designated in the automatic payment instruction to the payee account designated in the automatic payment instruction. In response to receiving the payment request, the payment service provider device and/or the account provider device may transfer funds from the payer account to the payee account e.g., over a network.)

In another example, the location determination device on the payer device 200 may determine a current location of the payer device 200 and that current location may be sent over a network to a payment service provider device and/or an account provider device to be compared with the payment locations associated with automatic payment instructions in the database to determine that the payer device 200 is in a payment location. In an embodiment, the payer device 200 may be determined to be in a payment location associated with an automatic payment instruction if the payer device is within a predetermined distance of the payment location (e.g., according to the Payment Location Proximity detail 412 discussed above.) In another embodiment, the location determination device may determine first location data for a current location of the payer device, and that first location data may be sent over a network to a payment service provider device and/or an account provider device to be compared to second location data for a payment location that is associated with an automatic payment instruction in the database to determine that the first location data corresponds to the payment location. In an embodiment, the first location data may be determined to be in a payment location associated with an automatic payment instruction if the first location data is within a predetermined distance of the second location data associated with the payment location (e.g., according to the Payment Location Proximity detail 412 discussed above.) In response to determining that the payment device 200 is in a payment location associated with an automatic payment instruction, a payment request may be sent over a network within the payment service provider and/or the account provider to make a payment from the payer account designated in the automatic payment instruction to the payee account designated in the automatic payment instruction. In response to receiving the payment request, the payment service provider device and/or the account provider device may transfer funds from the payer account to the payee account (e.g., over a network.)

In an embodiment, upon determining that the payer device 200 is in a payment location associated with an automatic payment instruction, the payment system may apply the payment details that were associated with the payment location as discussed above.

For example, in one embodiment, the payment device 200, the payment service provider device, and/or the account provider device may apply the Payment Amount detail 402 such that the payment request includes a payment amount that was included with the Payment Amount detail 402.

In another embodiment, the payment device 200, the payment service provider device, and/or the account provider device may apply the Payment Time Period detail 404 by retrieving a current time and determining if the current time is within a payment time period that was included with the Payment Time Period detail 404. If the current time within the payment time period, the payment request is sent, while if the current time is outside the payment time period, the payment request is not sent.

In another embodiment, the payment device 200, the payment service provider device, and/or the account provider device may apply the Maximum Payment Frequency detail 406 by retrieving a plurality of previous payments from the payer account to the payee account that are designated in the automatic payment instruction and determining whether that plurality of previous payments exceeds a maximum payment frequency that was included with the Maximum Payment Frequency detail 406. If the plurality of previous payments do not exceed the maximum payment frequency, the payment request is sent, while if the plurality of previous payments exceed the maximum payment frequency, the payment request is not sent.

In another embodiment, the payment device 200, the payment service provider device, and/or the account provider device may apply the Pay Automatically detail 408 and send the payment request automatically upon determining that the payer device 200 is a payment location that is associated with an automatic payment instruction.

In another embodiment, the payment device 200, the payment service provider device, and/or the account provider device may apply the Request Confirmation Before Paying detail 410 and provide a confirmation request to the payer device 200 before sending the payment request. For example, as illustrated in FIG. 5, an alert 500 may be provided on the payer device 200 (e.g., from the payer device 200, over the network from the payment service provider device and/or the account provider device, etc.) that may include a payment confirmation section 502, a location indicator 504, a last payment indicator 506, and a Send Payment Request button 508. The payment confirmation section 502 includes a payment amount input 502a that may be pre-populated with an amount that was provided in the automatic payment instruction, that may be editable using the payer device 200 to provide a different payment amount, and/or that may be blank such that a payment amount must be provided using the payer device 200. The payer may then provide, edit, and/or confirm the payment amount and the information in the alert 500 and send the payment request by selecting the Send Payment Request button 508.

Thus, a system and method for making automatic payments based on a payer location is provided that allows a payer to define locations, times, amounts, and other details of an automatic payment. When a payer device of the payer is determined to be in a payment location in which the payer has indicated they would like to make automatic payments, a payment request may be sent to make a payment from a payer account to a payee account. Such systems and methods allow an payer to automatically pay a payee when the payer is in the same location as the payee.

Figure 6:
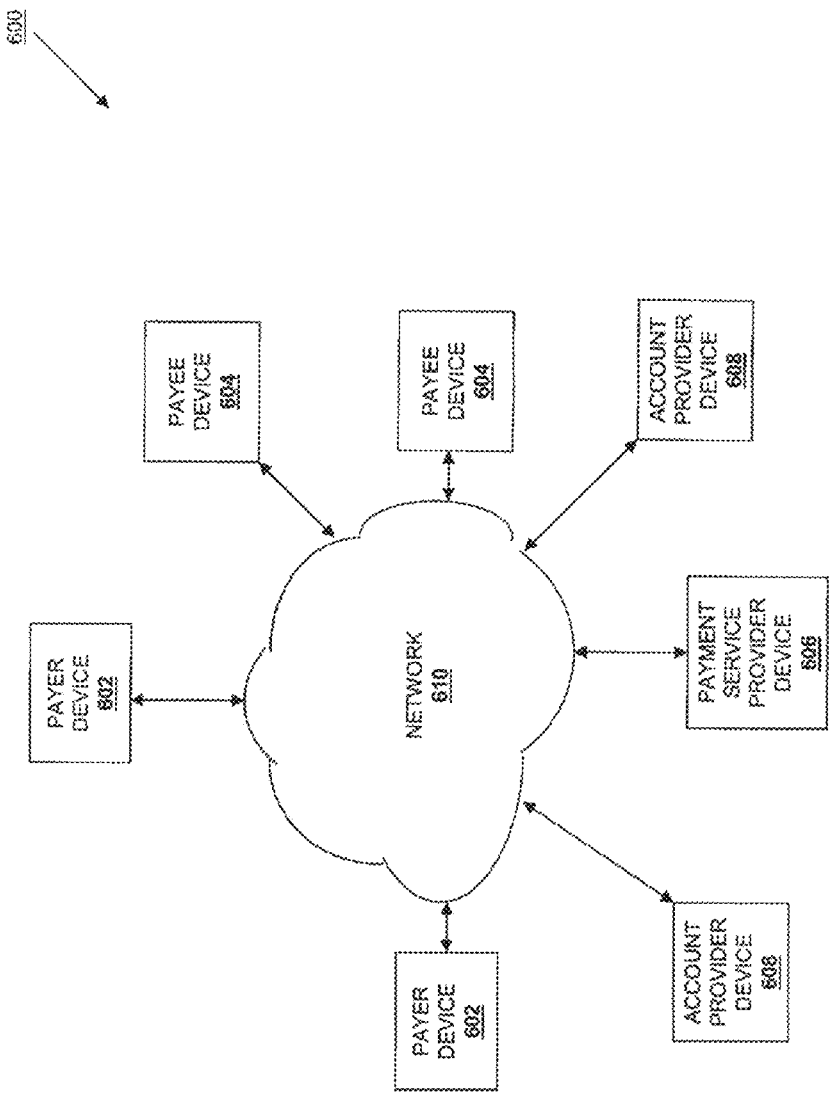
FIG. 6 is a schematic view illustrating an embodiment of a networked system.

Referring now to FIG. 6, an embodiment of a networked system 600 used in the payment system described above is illustrated. The networked system 600 includes a plurality of payer devices 602, a plurality of payee devices 604, a payment service provider device 606, and a plurality of account holder devices 608 in communication over a network 610. Any of the payer devices 602 may be the payer device 200, discussed above. The payee devices 604 may be the payee devices discussed above and may be operated by the payees discussed above. The payment service provider device 606 may be the payment service provider devices discussed above and may be operated by a payment service provider such as, for example, PayPal Inc. of San Jose, Calif. The account provider devices 608 may be the account provider devices discussed above and may be operated by the account providers discussed above such as, for example, credit card account providers, bank account providers, savings account providers, and a variety of other account providers known in the art.

The payer devices 602, payee devices 604, payment service provider device 606, and account provider devices 608 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 600, and/or accessible over the network 610.

The network 610 may be implemented as a single network or a combination of multiple networks. For example, in various embodiments, the network 610 may include the Internet and/or one or more intranets, landline networks, wireless networks, and/or other appropriate types of networks.

The payer device 602 may be implemented using any appropriate combination of hardware and/or software configured for wired and/or wireless communication over network 610. For example, in one embodiment, the payer device 602 may be implemented as a personal computer of a user in communication with the Internet. In other embodiments, the payer device 602 may be a smart phone, personal digital assistant (PDA), laptop computer, and/or other types of computing devices.

The payer device 602 may include one or more browser applications which may be used, for example, to provide a convenient interface to permit the payer to browse information available over the network 610. For example, in one embodiment, the browser application may be implemented as a web browser configured to view information available over the Internet.

The payer device 602 may also include one or more toolbar applications which may be used, for example, to provide user-side processing for performing desired tasks in response to operations selected by the payer. In one embodiment, the toolbar application may display a user interface in connection with the browser application.

The payer device 602 may further include other applications as may be desired in particular embodiments to provide desired features to the payer device 602. In particular, the other applications may include a payment application for payments assisted by a payment service provider through the payment service provider device 606. The other applications may also include security applications for implementing user-side security features, programmatic user applications for interfacing with appropriate application programming interfaces (APIs) over the network 610, or other types of applications. Email and/or text applications may also be included, which allow the payer to send and receive emails and/or text messages through the network 610. The payer device 602 includes one or more user and/or device identifiers which may be implemented, for example, as operating system registry entries, cookies associated with the browser application, identifiers associated with hardware of the payer device 602, or other appropriate identifiers, such as a phone number. In one embodiment, the user identifier may be used by the payment service provider device 606 and/or account provider device 608 to associate the user with a particular account as further described herein.

The payee device 604 may be maintained, for example, by a conventional or on-line merchant, conventional or digital goods seller, individual seller, and/or application developer offering various products and/or services in exchange for payment to be received conventionally or over the network 610. In this regard, the payee device 604 may include a database identifying available products and/or services (e.g., collectively referred to as items) which may be made available for viewing and purchase by the payer.

The payee device 604 also includes a checkout application which may be configured to facilitate the purchase by the payer of items. The checkout application may be configured to accept payment information from the user through the payer device 602, the account provider through the account provider device 608, and/or from the payment service provider through the payment service provider device 606 over the network 610.

Figure 7:
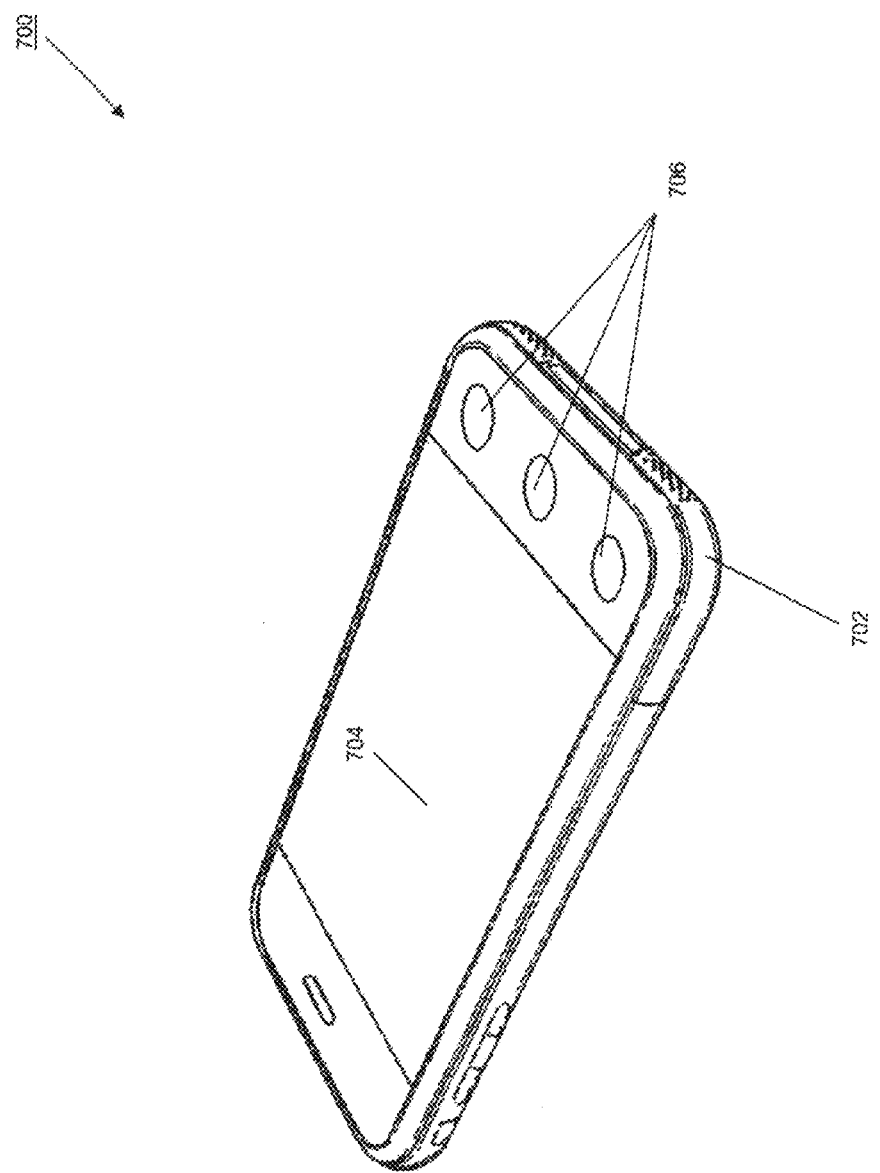
FIG. 7 is a perspective view illustrating an embodiment of a payer device.

Referring now to FIG. 7, an embodiment of a payer device 700 is illustrated. The payer device 700 may be the payer devices 200 and/or 602. The payer device 700 includes a chassis 702 having a display 704 and an input device including the display 704 and a plurality of input buttons 706. One of skill in the art will recognize that the payer device 700 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 8:
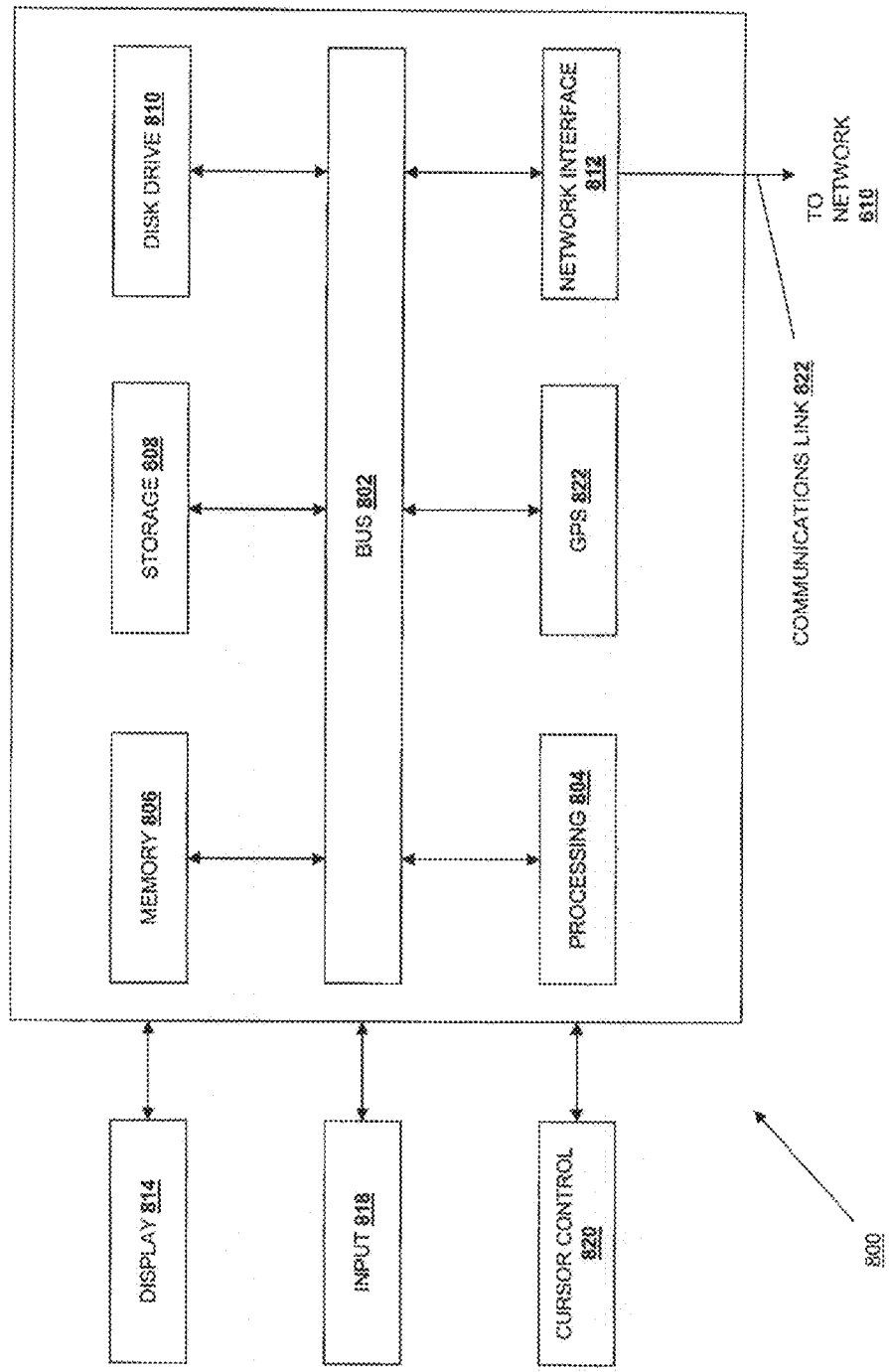
FIG. 8 is a schematic view illustrating an embodiment of a computer system.

Referring now to FIG. 8, an embodiment of a computer system 800 suitable for implementing, for example, the payer device 200, the payer device 602, the payer device 700, the payees device 604, the payment service provider device 606, and/or the account provider device 608, is illustrated. It should be appreciated that other devices utilized by payer, payees, payment service providers, and account providers in the payment system discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), and/or a location determination component 822 (e.g., a Global Positioning System (GPS) device as illustrated, a cell tower triangulation device, and/or a variety of other location determination devices known in the art.) In one implementation, the disk drive component 810 may comprise a database having one or more disk drive components.

In accordance with embodiments of the present disclosure, the computer system 800 performs specific operations by the processor 804 executing one or more sequences of instructions contained in the memory component 806, such as described herein with respect to the payer device 200, 602, and 700, the payee device(s) 604, the payment service provider device 606, and/or the account provider device(s) 608. Such instructions may be read into the system memory component 806 from another computer readable medium, such as the static storage component 808 or the disk drive component 810. In other embodiments, hard-wired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Figure 9:
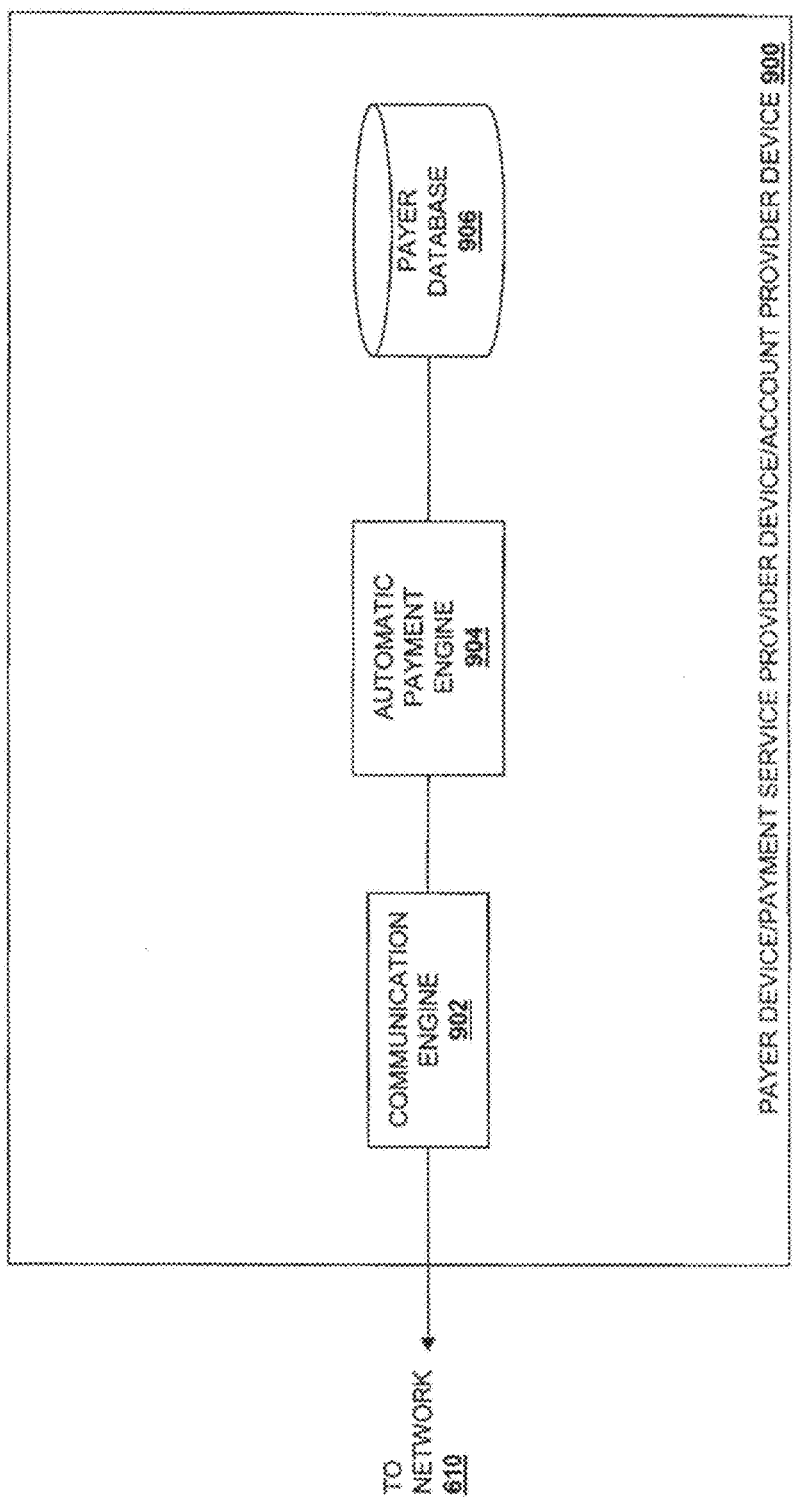
FIG. 9 is a schematic view illustrating an embodiment of a user device, payment service provider device, and/or an account provider device.

Referring now to FIG. 9, an embodiment of a payer device/payment service provider device/account provider device 900 is illustrated. In an embodiment, the device 900 may be the payer device 200, 602, and 700, the payment service provider device 606 and/or the account holder device 608. The device 900 includes a communication engine 902 that is coupled to the network 610 and to an automatic payment engine 904 that is coupled to a payer database 906. The communication engine 902 may be software or instructions stored on a computer-readable medium that allows the device 900 to send and receive information over the network 610. The automatic payment engine 904 may be software or instructions stored on a computer-readable medium that is operable to receive automatic payment instructions, payment locations, and payment details and associate them with payers accounts in the database 1006, receive payment locations to determine whether the payer device is in a payment location associated with an automatic payment instruction, send payment requests, and provide any of the other functionality that is discussed above. While the database 906 has been illustrated as located in the payer device 900, one of skill in the art will recognize that it may be connected to the automatic payment engine 904 through the network 210 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for making an electronic location-based automatic payment that provides time and location-based security, comprising:

receiving, by a system provider device across a network from a payer device via a graphical user interface displayed on the payer device, an automatic payment instruction that designates a payee account, a payment location, and a payment time period;

associating, by the system provider device in a database, the automatic payment instruction with a payer account that is linked to the payer device;

receiving, by the system provider device across the network from the payer device at each of a plurality of different times that are subsequent to the association of the automatic payment instruction with the payer account, Global Positioning System (GPS) information that is generated by a GPS device in the payer device;

determining, by the system provider device at each of the plurality of different times, whether automatic payment conditions are satisfied by determining whether:

the payer device is in the payment location in response to the GPS information corresponding to the payment location; and that a current time is within the payment time period; and automatically causing, by the system provider device or each of one or more instances in which it is determined that the automatic payment conditions are satisfied, a payment to be made from the payer account to the payee account designated by the automatic payment instruction.

2. The method of claim 1, wherein the determining whether the payer device is in the payment location includes, at each of the plurality of different times:

comparing, by the system provider device, GPS location coordinates that are included in the GPS information to location data that is associated with the payment location; and determining, by the system provider device, that the GPS location coordinates are within a predetermined distance of the location data.

3. The method of claim 1, wherein the information includes a GPS location determined by the payer device.

4. The method of claim 1, wherein the automatic payment instruction designates a payment amount, and wherein the payment from the payer account to the payee account includes the payment amount each of the one or more instances in which the automatic payment conditions are satisfied.

5. The method of claim 1, wherein the payment time period designates at least one day of the week.

6. The method of claim 1, wherein the automatic payment instruction designates a maximum payment frequency and the method further comprises, at each of the plurality of different times:

retrieving, by the system provider device across the network, a plurality of previous payments from the payer account to the payee account; and determining, by the system provider device, that the plurality of previous payments do not exceed the maximum payment frequency, wherein the automatic payment conditions are satisfied when the payer device is in the payment location during the payment time period and the plurality of previous payments do not exceed the maximum payment frequency.

7. The method of claim 1, further comprising, at each of the plurality of different times:
   providing, by the system provider device across the network, an alert to the payer device in response to determining that the payer device is in the payment location during the payment time period; and
   receiving, by the system provider device across the network, a payment confirmation from the payer device, wherein the automatic payment conditions are satisfied when the payer device is in the payment location during the payment time period and the payment confirmation is received.

8. The method of claim 7, further comprising, for at least one of the plurality of different times:
   receiving, by the system provider device across the network, a payment amount in response to providing the alert, wherein the payment request to make the payment from the payer account to the payee account includes the payment amount.

9. A non-transitory machine-readable medium having stored thereon machine-readable instructions excitable to cause a machine to perform operations comprising:
   receiving, across a network via a graphical user interface displayed on the payer device, an automatic payment instruction that designates a payee account, a payment location, and a payment time period;
   associating, in a database, the automatic payment instruction with a payer account that is linked to the payer device;
   receiving, across the network from the payer device at each of a plurality of different times that are subsequent to the association of the automatic payment instructions with the payer account, Global Positioning System (GPS) information that is generated by a GPS device in the payer device;
   subsequent to the association of the payment location with the automatic payment instruction, determining, at each of the plurality of different times, whether automatic payment instructions are satisfied by determining whether:
      the payer device is in the payment location in response to the GPS information corresponding to the payment location; and
      that a current time is within the payment time period; and
   automatically causing, for each of one or more instances in which it is determined that the automatic payment conditions are satisfied, a payment to be made from the payer account to the payee account designated by the automatic payment instruction.

10. The non-transitory machine-readable medium of claim 9, wherein the determining whether the payer device is in the payment location includes, at each of the plurality of different times:
    comparing GPS location coordinates that are included in the GPS information to location data that is associated with the payment location; and
    determining that the GPS location coordinates are within a predetermined distance of the location data.

11. The non-transitory machine-readable medium of claim 9, wherein the GPS information includes a GPS location determined by the payer device.

12. The non-transitory machine-readable medium of claim 9, wherein the automatic payment instruction designates a payment amount, and wherein the payment from the payer account to the payee account includes the payment amount each of the one or more instances in which the automatic payment conditions are satisfied.

13. The non-transitory machine-readable medium of claim 10, wherein the payment time period designates at least one day of the week.

14. The non-transitory machine-readable medium of claim 10, wherein the automatic payment instruction designates a maximum payment frequency and the operations further comprises, at each of the plurality of different times:
    retrieving, across the network, a plurality of previous payments from the payer account to the payee account; and
    determining that the plurality of previous payments do not exceed the maximum payment frequency, wherein the automatic payment conditions are satisfied when the payer device is in the payment location during the payment time period and the plurality of previous payments do not exceed the maximum payment frequency.

15. The non-transitory machine-readable medium of claim 9, wherein the operations further comprises, at each of the plurality of different times:
    providing, across the network, an alert to the payer device in response to determining that the payer device is in the payment location during the payment time period; and
    receiving, across the network, a payment confirmation from the payer device, wherein the automatic payment conditions are satisfied when the payer device is in the payment location during the payment time period and the payment confirmation is received.

16. The non-transitory machine-readable medium of claim 15, wherein the operations further comprises, for at least one of the plurality of different time:
    receiving, across the network, a payment amount in response to providing the alert, wherein the payment request to make the payment from the payer account to the payee account includes the payment amount.

17. An electronic location-based automatic payment system that provides time and location-based security, comprising:
    a non-transitory memory; and
    one or more hardware processors configured to execute instructions to cause the system to perform operations comprising:
       receiving, across a network via a graphical user interface displayed on the payer device, an automatic payment instruction that designates a payee account, a payment location, and a payment time period;
       associating, in the non-transitory memory, the automatic payment instruction with a payer account that is linked to the payer device;
       receiving across the network from the payer device at each of a plurality of different times that are subsequent to the association of the automatic payment instruction with the payer account, Global Positioning System (GPS) information that is generated by a GPS device in the payer device;
       determining, at each of the plurality of different times whether automatic payment conditions are satisfied by determining whether:
          the payer device is in the payment location in response to the GPS information corresponding to the payment location; and
          that a current time is within the payment time period; and automatically causing, for each of one or more instances in which it is determined that the automatic payment conditions are satisfied, a payment to be made from the payer account to the payee account designated by the automatic payment instruction.

18. The system of claim 17, wherein the payment time period designates at least one day of the week.

19. The system of claim 17, wherein the automatic payment instruction designates a maximum payment frequency and the operations further comprise, at each for each of the plurality of different times:
   retrieving, across the network, a plurality of previous payments from the payer account to the payee account; and
   determining that the plurality of previous payments do not exceed the maximum payment frequency, wherein the automatic payment conditions are satisfied when the payer is in the payment location during the payment time period and the plurality of previous payments do not exceed the maximum payment frequency.

20. The system of claim 17, wherein the operations further comprise, for at least one of the plurality of different times:
   providing, across the network, an alert to the payer in response to determining that the payer is in the payment location during the payment time period; and
   receiving, across the network, a payment confirmation from the payer device, wherein the automatic payment conditions are satisfied when the payer is in the payment location during the payment time period and the payment confirmation is received.

* * * * *